(12) United States Patent
Seshadri

(10) Patent No.: US 10,673,650 B2
(45) Date of Patent: *Jun. 2, 2020

(54) PROGRAMMABLE TUNNEL CREATION FOR HARDWARE-BASED PACKET PROCESSING

(71) Applicant: Amazon Technologies, Inc., Seattle, WA (US)

(72) Inventor: Kiran Kalkunte Seshadri, Cedar Park, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/049,667

(22) Filed: Jul. 30, 2018

(65) Prior Publication Data

US 2018/0367338 A1 Dec. 20, 2018

Related U.S. Application Data

(63) Continuation of application No. 14/852,291, filed on Sep. 11, 2015, now Pat. No. 10,038,572.

(51) Int. Cl.
*H04L 12/46* (2006.01)
*H04L 29/06* (2006.01)
*H04L 12/741* (2013.01)
*H04L 12/721* (2013.01)

(52) U.S. Cl.
CPC .......... *H04L 12/4633* (2013.01); *H04L 69/22* (2013.01); *H04L 45/66* (2013.01); *H04L 45/745* (2013.01)

(58) Field of Classification Search
CPC ... H04L 12/4633; H04L 69/22; H04L 45/745; H04L 45/66
See application file for complete search history.

(56) References Cited

U.S. PATENT DOCUMENTS

| 7,082,140 | B1 | 7/2006 | Hass |
| 8,230,493 | B2 | 7/2012 | Davidson et al. |
| 8,331,243 | B2 | 12/2012 | Mohan et al. |
| 8,416,789 | B1 | 4/2013 | Busch et al. |
| 8,493,851 | B2 | 7/2013 | Fan |
| 10,038,572 | B1 * | 7/2018 | Seshadri ............ H04L 12/4633 |

(Continued)

FOREIGN PATENT DOCUMENTS

WO 2015018323 2/2015

*Primary Examiner* — Chi H Pham
*Assistant Examiner* — Weibin Huang
(74) *Attorney, Agent, or Firm* — Robert C. Kowert; Kowert, Hood, Munyon, Rankin & Goetzel, P.C.

(57) ABSTRACT

A packet processor may implement programmable tunnel creation. A network packet may be received at a packet processor. A tunneling protocol may be identified for the network packet. The packet processor may access one or more memories to obtain tunnel header data that includes a tunnel header and field identifiers which indicate respective fields in the tunnel header that are determined based on data in the network packet. The tunnel header data may have been stored in the one or more memories prior to receiving the network packet. The network packet may be modified to insert the tunnel header into the network packet including the respective fields indicated by the field identifiers. The modified packet may then be transmitted.

20 Claims, 8 Drawing Sheets

(56) References Cited

U.S. PATENT DOCUMENTS

| | | | |
|---|---|---|---|
| 2008/0008168 A1* | 1/2008 | Nadeau | H04L 69/22 370/389 |
| 2008/0304456 A1 | 12/2008 | Iino et al. | |
| 2011/0161521 A1 | 6/2011 | McDysan et al. | |
| 2014/0016545 A1* | 1/2014 | Jaiswal | H04L 69/22 370/328 |
| 2014/0247830 A1 | 9/2014 | Kolbe et al. | |
| 2014/0301396 A1* | 10/2014 | Hong | H04L 49/25 370/392 |
| 2015/0098472 A1* | 4/2015 | Choi | H04W 40/02 370/392 |
| 2015/0295729 A1* | 10/2015 | Bevinamarad | H04L 12/4633 370/474 |
| 2016/0191380 A1* | 6/2016 | De | H04L 45/74 370/338 |

* cited by examiner

PROGRAMMABLE TUNNEL CREATION FOR HARDWARE-BASED PACKET PROCESSING

This application is a continuation of U.S. patent application Ser. No. 14/852,291, filed Sep. 11, 2015, now U.S. Pat. No. 10,038,572, which is hereby incorporated by reference herein in its entirety.

BACKGROUND

Network communications are indispensable to the functioning of modern society. Networking infrastructure that supports the transmission of network communications is constantly challenged to keep pace with the increasing demand to leverage network communications for faster service, better performance, greater reach, or any other benefit that networking provides. Network switches, routers, bricks and other networking devices may need to increase the speed and capacity with which network communications are processed. For example, network processing operations may be moved from software dependent or software controlled implementations to hardware-based solutions in order to increase the speed at which network processing operations are performed. However, hardware-based solutions networking solutions can be costly to implement and quickly become obsolete in dynamic networking environments.

Figure 1:
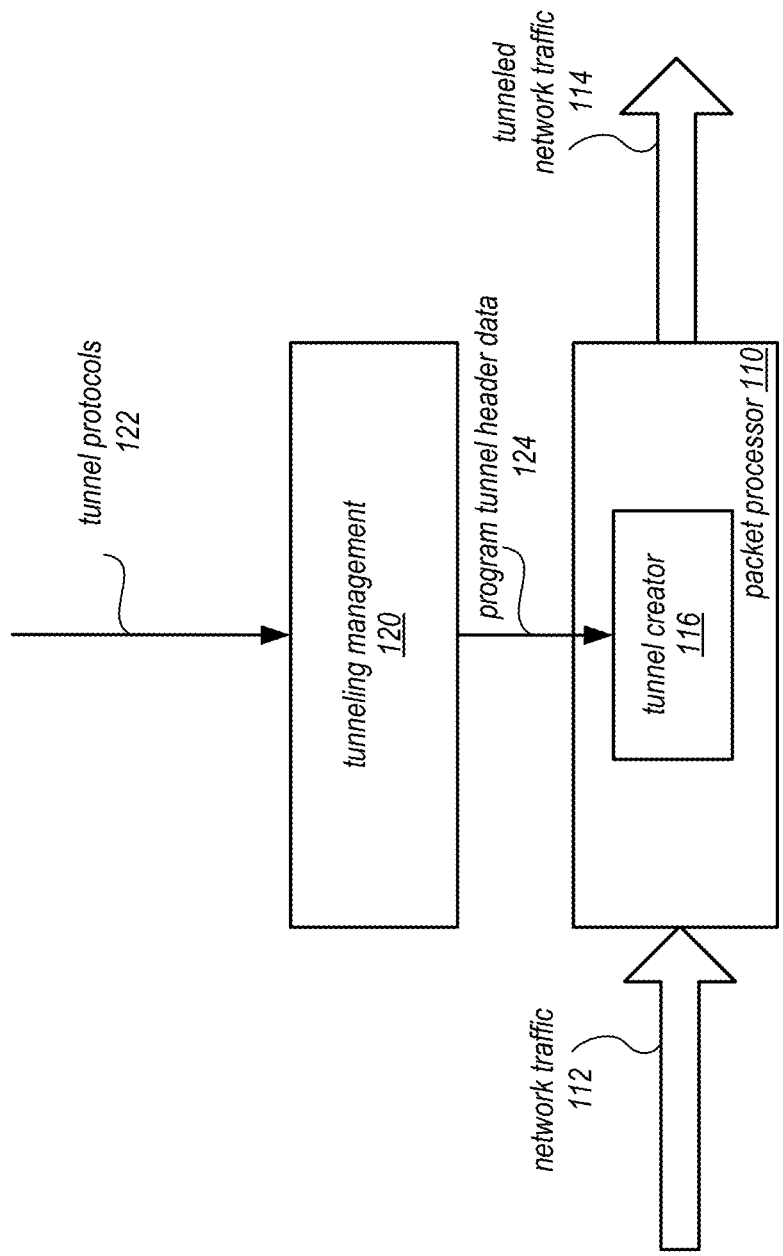
FIG. 1 illustrates a logical block diagram of programmable tunnel creation for hardware-based packet processing, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware - for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described herein may implement tunnel creation for hardware-based packet processing. Tunneling protocols increase the flexibility and availability of network communications. Instead of blocking communications between networks that do not share or support similar communication protocols, a tunneling protocol may be implemented to establish communication between the different networks or systems. For example, the Internet operates over a variety of interconnected networks that utilize a common protocol, Internet Protocol (IP) version 4. A newer version of IP, IP version 6 (IPv6) is now being implemented for some networks in order to provide greater capabilities when communicating utilizing the IPv6 protocol. Not all networks, however, support IPv6. Instead of limiting IPv6 communications to those networks that support them, IPv6 tunneling may be implemented to encapsulate communications implemented in IPv6 with an IPv4 tunnel header. In this way, the IPv6 protocol can still be utilized at those networks or systems that support it, while the communications can travel via the greater number of networks that support IPv4.

Tunneling protocols may be enabled or applied to packets of network traffic. Packets may be discrete portions of the stream of data transmitted over various types of network connections, such as twisted pair connections, coaxial connections, or fiber optic connections formatted according to particular protocols. In at least some embodiments, network packets may be a unit of data according to layer 3, the network layer, of the open systems interconnection (OSI) model for communications. Layer 3 protocols may include protocols such as IP, internet control message protocol (ICMP), IP security (IPsec), routing information protocol (RIP), and many others. Note that different tunneling protocols, however, may be inserted to encapsulate data at differing levels of the OSI model, such as layer 2, layer 2.5, layer 3, and layer 4.

Packet processors and other devices that implement a packet processing pipeline may apply tunneling protocols to network packets that are received at the networking device. Switches, for instance, performing forwarding operations may inset tunnel headers to encapsulate all or portions of network packets when processed at the switch. Packet processors, and other hardware-based devices that implement packet processing pipelines, may be limited to the tunneling protocols hardwired into the packet processor. When new tunneling protocols are implemented, a networking device may have to resort to applying tunneling protocols via software. As software-based tunneling application relies upon a greater number of operations, the speed optimizations provided by hardware-based packet processing are lost, even if the remaining packet processing operations are performed by the packet processor. In various embodiments, programmable tunnel creation may be implemented so that a hardware-based packet processing solution, such as a packet processor, may be configured to apply new tunneling protocols without assistance from software-based tunneling methods.

FIG. 1 illustrates a logical block diagram of programmable tunnel creation for hardware-based packet processing, according to some embodiments. Packet processor 110 may be specialized hardware, such as an application specific integrated circuit (ASIC) or other electronic circuitry (e.g., packet processor 250 in FIG. 2), which performs various packet processing operations including tunneling. Packet processor 110 may implement tunnel creator 116 to insert tunnel headers into various network packets identified out of network traffic 112 received at packet processor 110. Tunnel creator 116 may insert the tunnel header according to tunnel header data that is stored in one or more memories (e.g., random access memories and/or content addressable memories). Tunnel header data may include the tunnel header, tunnel configuration, and field identifiers that identify fields in the tunnel header that are dependent on the data of the packet for which the tunnel header is being inserted. For example, a tunnel header may be read from the memory, and one or more fields in the tunnel header, such as a time-to-live field and/or a checksum field, may need to be updated in the tunnel header with information specific to the packet. The TTL and the checksum values may be determined from the data in the packet at packet processor 110 as part of a default set of data determined for the packet. Once inserted (and various other packet processing operations are performed), the tunneled network traffic 114 may be transmitted from packet processor 110.

Tunneling management 120 may provide an interface via which new tunneling protocols 122 may be implemented at packet processor 110. Tunneling management may program tunnel header data 124 in the memories accessed by tunnel creator so that tunnel creator may insert a tunnel header data according to the tunnel header data for a new tunneling protocol when identified for a network packet. FIGS. 4-8, discuss such techniques in further detail below.

Please note that previous descriptions are not intended to be limiting, but are merely provided as a logical example of programming tunnel creation for hardware-based packet processing.

This specification begins with a general description of a networking device, which may implement programming tunnel creation for hardware-based packet processing. Then various examples of a packet processor and tunnel creator are discussed, including different components/modules, or arrangements of components/module that may be implemented and which may perform programming tunnel creation for hardware-based packet processing. A number of different methods and techniques to implement programming tunnel creation for hardware-based packet processing are then discussed, some of which are illustrated in accompanying flowcharts. Various examples are provided throughout the specification.

Figure 2:
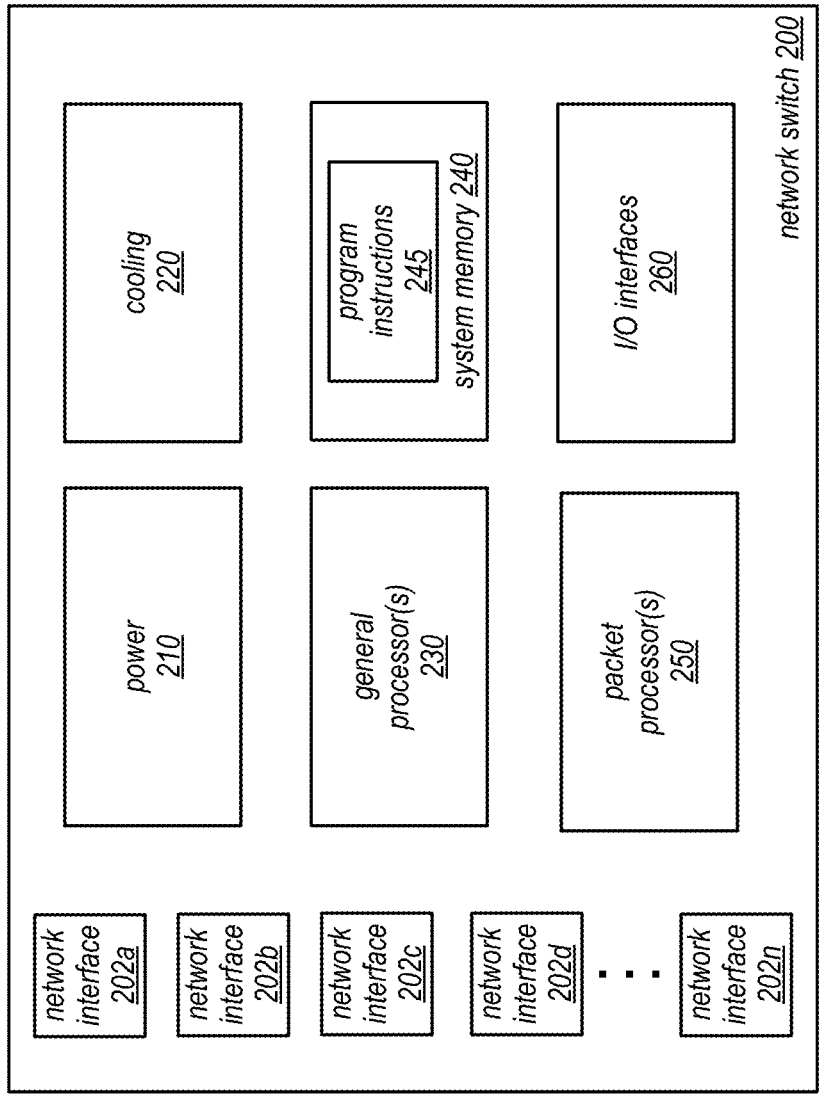
FIG. 2 is a logical block diagram illustrating a networking device that implements programmable hardware-based tunnel creation for packet processing, according to some embodiments.

FIG. 2 is a logical block diagram illustrating a networking device that implements programmable hardware-based tunnel creation for packet processing, according to some embodiments. Networking device 200 may be a networking device configured to connect, route, forward, or otherwise facilitate the communication of different devices, systems or networks via network connections to the networking device (e.g., a switching hub, bridging hub, MAC bridge, or any other networking hardware that performs packet processing for wired or wireless networks). A networking device may provide electrical and logical network connections. Networking devices may operate utilizing data included in different OSI layers, such as layers 2 and 3 to make forwarding determinations (e.g., to send a network packet received from one source connected to the switch to another source connected to the switch). Please note that networking device, such as a switch, in some contexts (e.g., when discussing layer 3 data) may be considered a type of router. Networking devices may also provide other services when facilitating communications, such as implementing network firewalls, network intrusion detection, and/or collecting metrics for performance analysis.

In at least some embodiments, networking device 200 may implement multiple network interfaces 202, which correspond to physical connections of different communication lines (e.g., twisted pair cables, coaxial cables, or fiber optic cables) connected to corresponding network interface ports. Network interfaces 202 may provide for different types, speeds, or other formats of network communication.

For example, network interfaces 202 may provide different ports for 10 Gigabit, 40 Gigabit, or 100 Gigabit Ethernet cables. Many ports support multiple speeds, such as both 10 Gigabit and 100 Gigabit Ethernet connections.

Power 210 may be one or more power supplies that provide electricity to the various electrical components that draw upon power to perform operations (e.g., cooling 220, general processor(s) 230, system memory 240, packet processor(s) 250, and/or I/O interfaces 260. Cooling 220 may be one or more fan units implemented to circulate air and draw heat out of network switch 200.

Networking device 200 may include general processor(s) 230 which may include multiple cores, and which may be single or multi-threaded) coupled to a system memory 240 via an input/output (I/O) interface 260. Switch 200 may be a uniprocessor system including one processor 230, or a multiprocessor system including several processors 230 (e.g., two, four, eight, or another suitable number). General processors 230 may be any suitable processors capable of executing instructions. For example, in various embodiments, processors 230 may be general-purpose or embedded processors implementing any of a variety of instruction set architectures (ISAs), such as the x86, PowerPC, SPARC, or MIPS ISAs, or any other suitable ISA. In multiprocessor systems, each of processors 230 may commonly, but not necessarily, implement the same ISA.

Networking device 200 includes one or more system memories 240 that are configured to store program instructions and data accessible by processor(s) 230. In various embodiments, system memories 240 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 240 may contain program instructions 245 that are executable by processor(s) 230 to implement tunnel management 300 in FIG. 3 discussed below as well as other management functions and interfaces for network switch 200. In various embodiments, program instructions 245 may be encoded in platform native binary, any interpreted language such as Java™ byte-code, or in any other language such as C/C++, Java™, etc., or in any combination thereof.

In some embodiments, program instructions 245 may include instructions executable to implement an operating system (not shown), which may be any of various operating systems, custom or off the shelf operating systems. Any or all of program instructions 245 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system via an I/O interface. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system as system memory or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface.

Networking device 200 may implement one or multiple I/O interface(s) 260 to provide access to networking device 200 (e.g., to provide new tunneling protocol tunnel header data to be applied). In one embodiment, I/O interfaces 260 may be configured to coordinate I/O traffic between processor 230, system memory 245 and any peripheral devices in the system. In some embodiments, I/O interfaces 260 may perform any necessary protocol, timing or other data transformations to convert data signals from one component (e.g., system memory 245) into a format suitable for use by another component (e.g., processor 230). In some embodiments, I/O interfaces 260 may include support for devices attached through various types of peripheral buses, such as a variant of the Peripheral Component Interconnect (PCI) bus standard or the Universal Serial Bus (USB) standard, for example. In some embodiments, the functions of I/O interfaces 260 may be split into two or more separate components, such as a north bridge and a south bridge, for example. Also, in some embodiments, some or all of the functionality of I/O interfaces 260, such as an interface to system memory 240, may be incorporated directly into processors 230.

Figure 3:
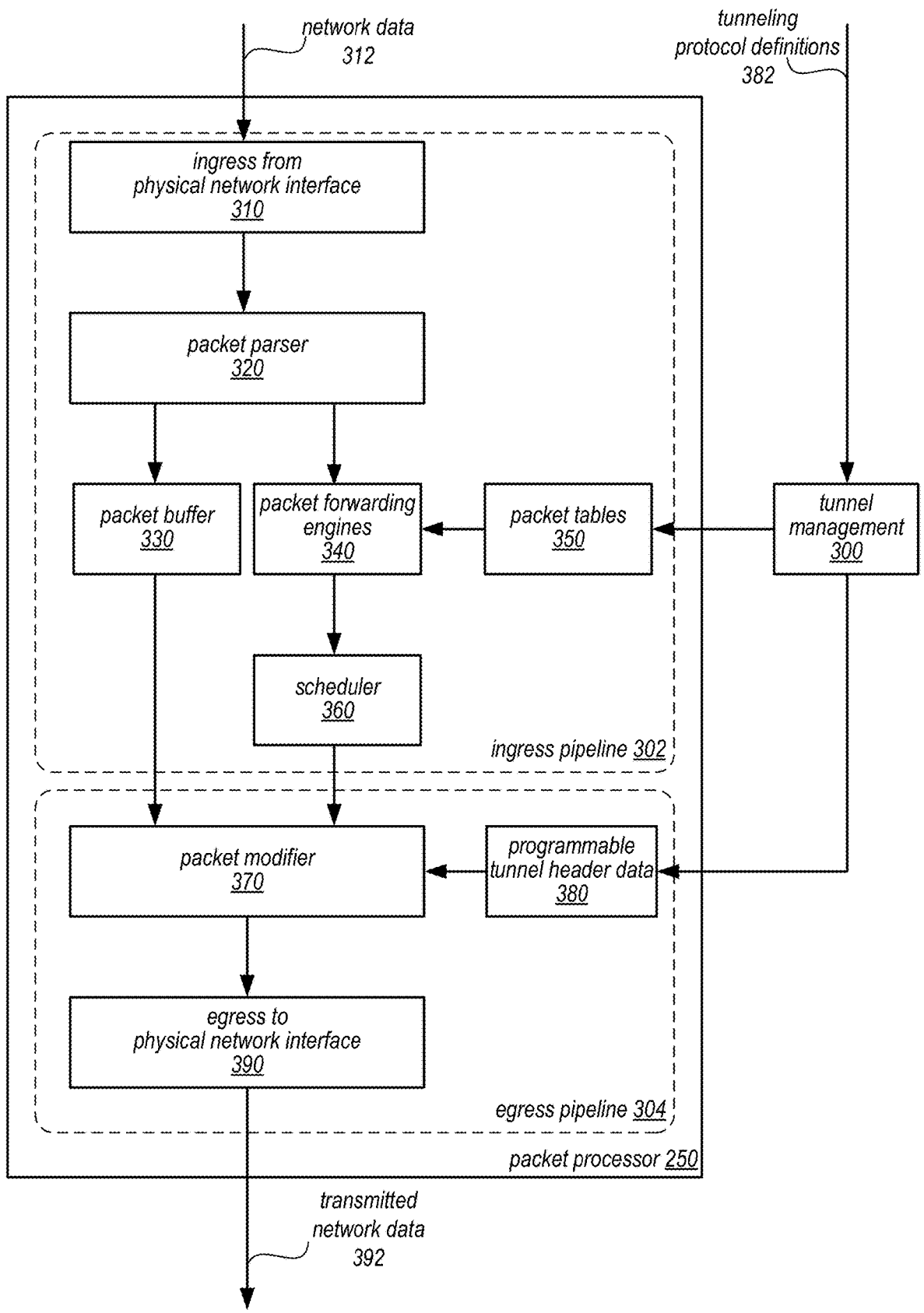
FIG. 3 is a logical block diagram illustrating a packet processor that performs tunnel creation, according to some embodiments.

As noted in FIG. 2, one or more multiple packet processors 250 may be implemented to process data received via network interface(s) 202 at networking device 200. Packet processor(s) 250 may be implemented as dedicated hardware to perform various stages of packet processing for network switch 200. For example, packet processor(s) 250 may be implemented as an application specific integrated circuit (ASIC), field programmable gate array (FPGA), or other dedicated circuitry that performs packet processing. Packet processor(s) 250 may be assigned to one or multiple network interface(s) 202, performing dedicated processing of network data received via the assigned network interface(s) 202. FIG. 3 is a logical block diagram illustrating a packet processor that performs tunnel creation, according to some embodiments. Note that a packet processor may sometimes be referred to as a "network switch" (e.g., when implemented as a switch-on-a-chip). However, the term "network switch" is also commonly used to describe networking hardware, such as a switching hub, that may implement one or multiple packet processors as well as other hardware (such as discussed above with regard to networking device 200 in FIG. 2). Therefore, the term "packet processor" has been used herein to prevent confusion when referring to dedicated hardware for performing packet forwarding.

Packet processor 250 may implement multiple processing pipelines to output a processed network packet. For example, as illustrated in FIG. 3, ingress pipeline 302 and egress pipeline 304 may be implemented to provide forwarding of network packets as part of the data plane so that forwarding may be performed without software-based techniques. Ingress pipeline 302 may include different components, units, or stages, such as an ingress unit from a physical network interface 310, a packet parser 320, a packet buffer 330, packet metadata lookups 340, and scheduler 350. Ingress pipeline 302 may also access packet tables 350 and other packet routing information. Egress pipeline 304 may include a packet modifier 370 with access to other packet modification data, such as programmable tunnel header data 380, and an egress unit to physical network interface 390.

As data is received from network interfaces, ingress unit 310 may provide a physical layer (PHY) interface and Ethernet Media Access Control (MAC) layer interface. These interfaces may evaluate a stream of network data 312 (e.g., bit stream) received at packet processor 250 to detect valid streams and segment the stream into datagrams (e.g., packets/frames). For instance, the PHY layer may receive and transmit data across physical connections (e.g., such as electrical signals received over twisted pair or coaxial cable or optical signals received over optical fiber) at network interfaces 202. The PHY layer may implement different techniques dependent on the speed or type of network interface configured (e.g., Ethernet 10 BASE-T, 100 BASE-TX, and 1000 BASE-T forms), such as encoding, multiplexing, synchronization, clock recovery and data serialization. Various signaling standards, such as IEEE 802.3, may govern the performance of the PHY layer consistent with the open systems interconnection (OSI) model for communications. The MAC layer may delimit frames and packets from the stream of data. Error checking may also be implemented at the MAC layer, checking for different errors, such as frame check sequence (FCS), inter-frame gap enforcement, and frame preambles.

Packet parser 320 may receive a network packet from ingress 310 and separate the packet header from the packet payload. The payload of the packet may be stored in packet buffer 330. Packet parser 320 may parse the packet header to determine and/or extract data for making a forwarding decision for the packet. For example, packet parser 320 may extract different level headers (e.g., L2, L3, and L4 headers) included in an Internet Protocol (IP) version 4 packet, such as the source MAC address, the destination MAC address, the source IP address, the destination IP address, and port numbers. The extracted data may then be utilized to perform lookups to make forwarding decisions at packet forwarding engines 340.

Packet forwarding engines 340 may access data stored in packet tables 350 to make forwarding and tunneling decisions for the network packet based on information in the packet header (e.g., packet metadata) extracted by packet parser 320. For example, packet forwarding engines 340 may perform lookups for data in level 2 (L2) portions of the packet to perform L2 forwarding. L2 forwarding may access a MAC address table in packet tables 350 perform two lookups (which may be in parallel). The first lookup may be performed with a key extracted from the packet header at packet parser 320 (e.g., a VLAN and source MAC address), to determine whether an entry for the packet is present in the MAC address table. If the source MAC address is unknown, then a mapping determination may be made to map the source MAC address to a port identified in the packet header. If the MAC address is known but attached to a different port than indicated in the MAC address table, then an operation may be performed to move the source MAC address to the port identified in the packet header. Otherwise the MAC address is known in the MAC address table. Another lookup to the MAC address table may also be performed with another key (e.g., the VLAN and the destination MAC address). The network packet may be routed if the MAC address table contains an entry for the destination MAC address owned by the networking device 200 (otherwise other operations may be performed, such as trapping the network packet for the CPU, bridging the packet out of a listed interface, or flooded out of all ports in an STP forwarding state).

Similarly, packet forwarding engines 340 may also perform lookups for data in level 3 (L3) portions of the packet to perform L3 forwarding, in some embodiments. For example, internet protocol (IP) headers for the packet may be evaluated with respect to entries in tables, such as a routing table, to determine forwarding to be performed. Packet forwarding engines 340 may also determine whether tunneling is enabled for the packet. For instance, a tunnel start table may be accessed which indicates whether a tunnel header is to be inserted into the packet. As packet forwarding engines 340 make forwarding decisions about the packet (e.g., for L2, L3 and/or tunneling), the decisions are maintained as packet metadata. The packet metadata may be provided to scheduler 360 for scheduling determinations.

As discussed above, packet tables 350 may be implemented in one or multiple storage devices, such as various memory devices (e.g., content addressable memory or random access memory) to store table data for performing different routing decisions. Tables may include a VLAN table, MAC address table, routing table, adjacency table, next hop table, tunnel start table, tunnel termination table, and/or actions table. Each of these different tables may be utilized to retrieve or determine packet forwarding decisions, tunneling decisions, and associated modifications that may need to be made to network packets.

Scheduler 360 may control the buffering of packets and scheduling of operations within packet processor 250. For example, scheduler 360 may implement a memory management unit to allocate available memory segments in packet buffer 330 to store packets to be buffered. If a packet needs to be buffered (e.g., because the egress interface is congested), scheduler 360 may store the packet in a private pool of memory assigned to a particular physical interface port for the packet or shared pools of memory to store packets (e.g., if the private pool of memory is full). Scheduler 360 may also implement a memory management unit to dequeue packets from packet buffer 330 for final processing and egress. Scheduler 360 may provide the appropriate metadata for a packet to modifier 360.

Network packets that have passed through ingress pipeline 302 may be scheduled or released from packet buffer 330 for modification, reassembly and egress as part of egress pipeline 304. Packet modifier 370 may be implemented to modify packet headers based on the routing decisions made at the packet metadata determine by packet forwarding engines 340. For example, as discussed below with regard to FIG. 4, if tunneling is enabled for a packet, packet modifier 370 may create and insert the appropriate tunnel header in order to encapsulate at least a portion of the packet to implement a tunneling protocol. Packet modifier 370 may also perform modifications to other data in the packet header. In some embodiments, programmable tunnel header data 380 may be accessed to obtain tunnel header data for creating the tunnel header. Once the modified packet has been reassembled, egress unit to physical network interface 290 may utilize the physical layer (PHY) interface and the Ethernet Media Access Control (MAC) layer interface to transmit network packets as network data 392 via the appropriate physical connection (e.g., coaxial, twisted pair, or optical cable).

In at least some embodiments, tunnel management 300 may be implemented as part of networking device 200 in order to program the tunneling protocols that may be applied by packet processor 250. Tunnel management 300 may be an application and/or interface stored in program instructions 245 and executable at general processor(s) 230 that allows a user to provide tunneling protocol definitions and other information to packet processor 250 so that packet processor 250 may perform the tunneling protocol. For example, tunnel management 300 may be configured to access on-chip memories implemented as part of packet processor(s)

Figure 8:
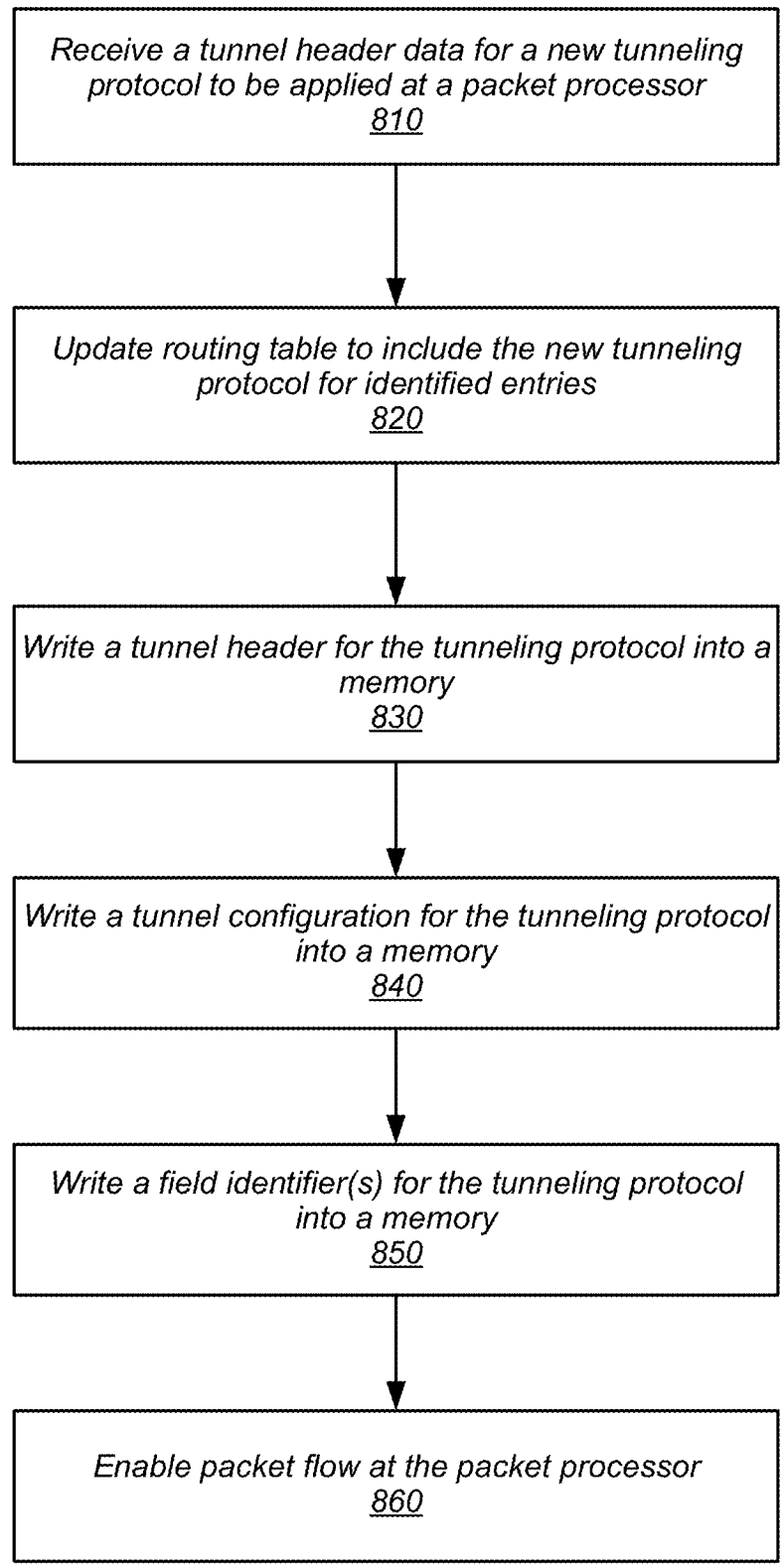
FIG. 8 is a high-level flowchart illustrating various methods and techniques to implement programming tunnel creation for network packet processing, according to some embodiments.

250 in order to store new tunnel header data for a new tunneling protocol 382. In this way, packet processor 250 may apply new tunneling protocols in hardware without relying upon software-based packet processing solutions to handle unknown tunneling protocols. For example, tunnel management 300 may provide a programmatic interface via which updated routing tables, new tunnel headers, new tunnel configurations, and other data to be inserted into the tunnel header that is dependent upon the particular packet being modified, such as field identifiers discussed below, may be updated. Then, subsequently received packets identified for tunneling according to a new tunneling protocol may be modified by packet processor 250 (instead of a software application, which for example, may be executing at the networking device on general processor(s) 230)). FIG. 8, discussed below, provides further detail for programming new tunneling protocols which may be performed by tunnel management 300.

Figure 4:
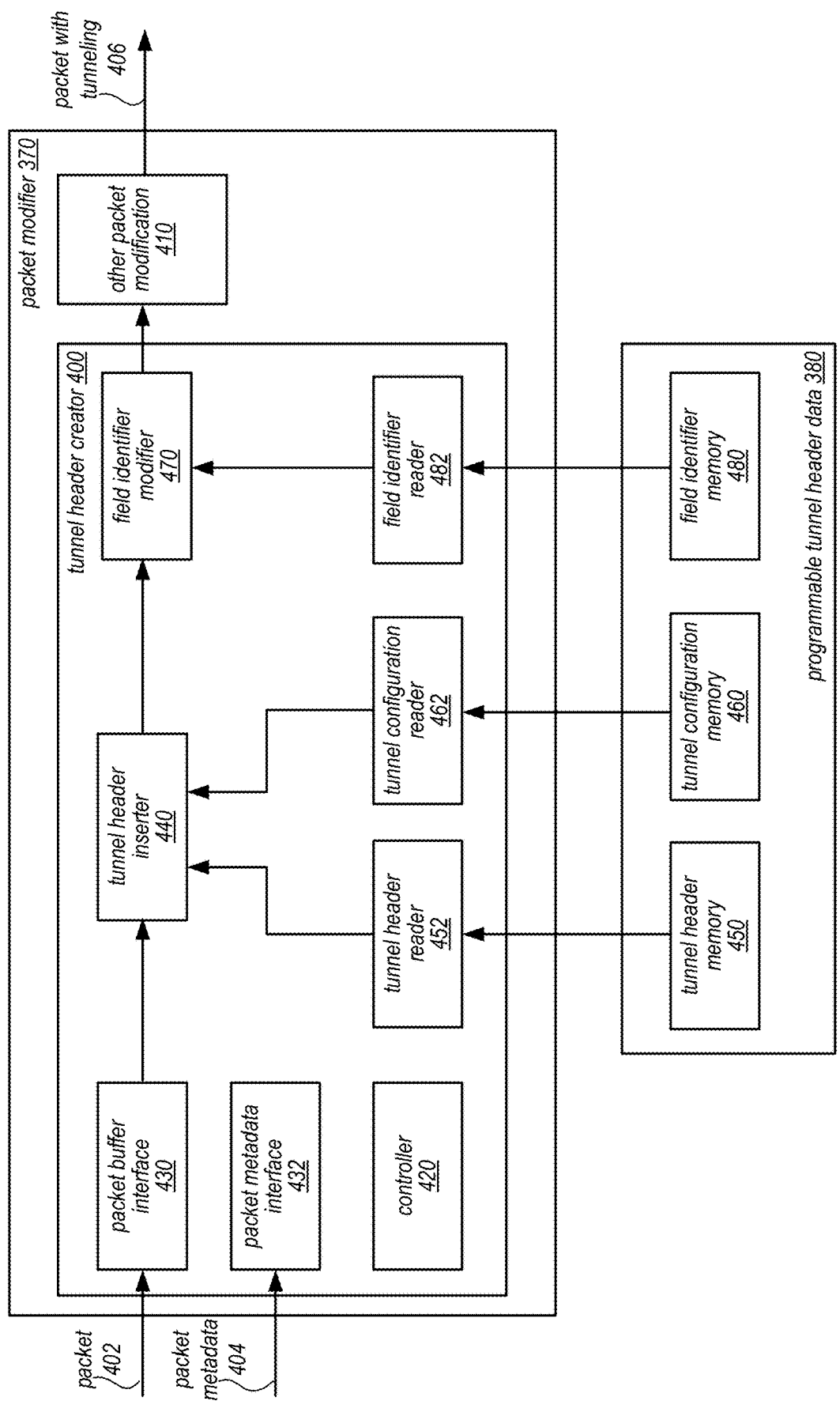
FIG. 4 is a logical block diagram illustrating a network packet modifier, according to some embodiments.

As noted above, tunnel headers may be created for those packets with tunneling enabled in packet modifier 370. FIG. 4 is a logical block diagram illustrating a network packet modifier, according to some embodiments. Packet modifier may implement tunnel header creator 400 to provide programmable tunnel creation. Tunnel header creator 400 may receive packets 402 and packet metadata 404 and insert a tunnel header to encapsulate the packet (or a portion of the packet) as part of a tunneling protocol in order to output a packet with tunneling 406.

Tunnel header creator may implement packet buffer interface 430 to receive packets from packet buffer 330 in FIG. 3 and provide the packet to tunnel header inserter 440 for tunnel header insertion. Likewise, packet metadata interface 432 may receive packet metadata for the packet from scheduler 360 in FIG. 3. Packet metadata received at tunnel header creator 400 may include an index or pointer to the tunnel header, whether tunneling is enabled for the packet, payload lengths for different levels (e.g., L2, L2.5, L3, and/or L4), offsets in the packet for the different levels (e.g., L2, L2.5, L3, and/or L4), and other non-tunnel metadata.

Tunnel header creator 400 may implement controller 420 to direct the insertion of a tunnel header and data values for fields in the tunnel header dependent upon the packet being modified. Controller 420 may utilize packet metadata 420 to obtain tunnel header data for tunnel header inserter 440 to insert the tunnel header. For example, controller 420 may utilize the index to the tunnel header to direct tunnel header reader 452 to read the tunnel header memory 450 at the identified index location. The tunnel header returned from tunnel header memory 450 may be provided via tunnel header reader 452 to tunnel header inserter 440.

Similarly, controller 420 may utilize the index to the tunnel header to direct tunnel configuration reader 462 to read the tunnel configuration memory 460 at the identified index location. The tunnel configuration read from the identified index location may then be utilized to direct tunnel header inserter 440 when inserting the tunnel header. The tunnel configuration may include the level at which the tunnel header is to be inserted (e.g., L2, L2.5, L3, or L4), the length of the tunnel header (e.g., in bytes), a field identifier list pointer, a number of field identifiers, and a next header type.

Once the tunnel header has been inserted into the packet by tunnel header inserter 440, the packet may be provided to field identifier modifier 470 to insert other tunnel header data which may be dependent upon the packet being modified. Controller 420 may direct field identifier reader 482 to read a first field identifier at the field identifier list pointer (obtained from tunnel configuration memory 460 for the tunnel) and insert the data indicated by the field identifier. For example, a tunneling protocol may require an update of a time-to-live (TTL) field. As TTL may be specific to a particular packet, the TTL may be obtained from packet metadata or from the packet itself, such as from the header being encapsulated. The field identifier, read from field identifier memory 480 may indicate that the type of data to insert is TTL, and thus tunnel modifier 470 may obtain TTL and insert the TTL field into the tunnel header. As the tunnel configuration indicates the number of field identifiers and the offset between identifiers, controller 420 may instruct field identifier reader 482 to provide field identifier modifier 470 with each identifier in the list for the tunnel header. As different tunneling protocols may have different fields to include in the tunnel header, the field identifier list may indicate the number of identifiers to be included in a tunnel header that is specific to a particular tunneling protocol. The encapsulated packet (or portion of the packet) may then be provided from field identifier modifier 470 to other packet modifications 410, which may perform those packet header modifications indicated in packet metadata 404 before outputting the packet 406.

Note that in various embodiments, programmable tunnel header data 380 may be implemented in multiple memories (as illustrated in FIG. 4) or other combinations of one or more memories. Different types of memory devices may be implemented to store tunnel header memory 450, tunnel configuration memory 460, and field identifier memory 480. For example, associative memory, such as content addressable memory, or any other semiconductor memory that may be implemented as part of packet processor 250 (e.g., on chip) or accessible to packet processor 250 (e.g., via an interconnect). In at least some embodiments, random access memory components, such as static random access memory (SRAM) or dynamic random access memory (DRAM), may implement tunnel header memory 450, tunnel configuration memory 460, and field identifier memory 480.

Figure 5:
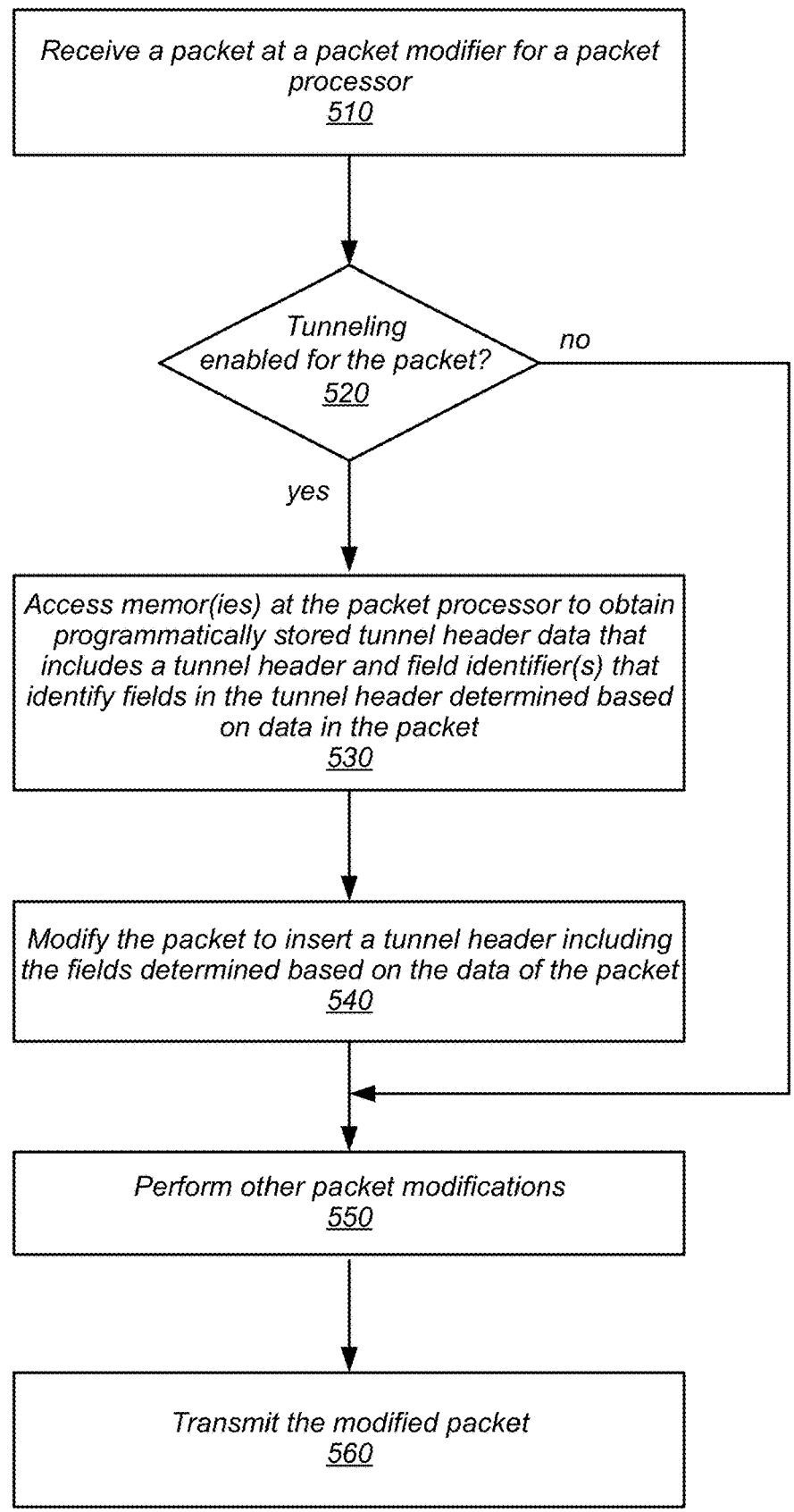
FIG. 5 is a high-level flowchart illustrating various methods and techniques to implement programmable hardware-based tunnel creation for packet processing, according to some embodiments.

FIGS. 2-4 provide an example of a networking device that implements a packet processor which may provide programmable tunnel creation. However, numerous other types or configurations of hardware-based packet processors or circuitry implementing a packet processing pipeline, such as other types of switches, routers, network bricks, or other networking hardware may provide programmable tunnel creation. FIG. 5 is a high-level flowchart illustrating various methods and techniques to implement programmable hardware-based tunnel creation for packet processing, according to some embodiments. The various components described above may implement these techniques (in addition to those described with regard to FIGS. 6 and 8 below) as well as various other packet processing pipelines and packet processors.

As indicated at 510, a network packet may be received at a packet modifier for a packet processor, in some embodiments. Various ingress packet processing techniques may have been performed prior to the receipt of the packet at the packet modifier which indicate forwarding decisions made with respect to the packet (e.g., L2 and L3 forwarding decisions discussed above with regard to FIG. 3). Packet metadata indicating the forwarding decisions, as well as other information about the packet, including various layer payload lengths and offsets may be included. Packet metadata may also include an indication as to whether a tunneling protocol is enabled for the packet. For example, a tunnel start bit may be set if tunneling is enabled, or not set if tunneling is not enabled for the packet.

Figure 6:
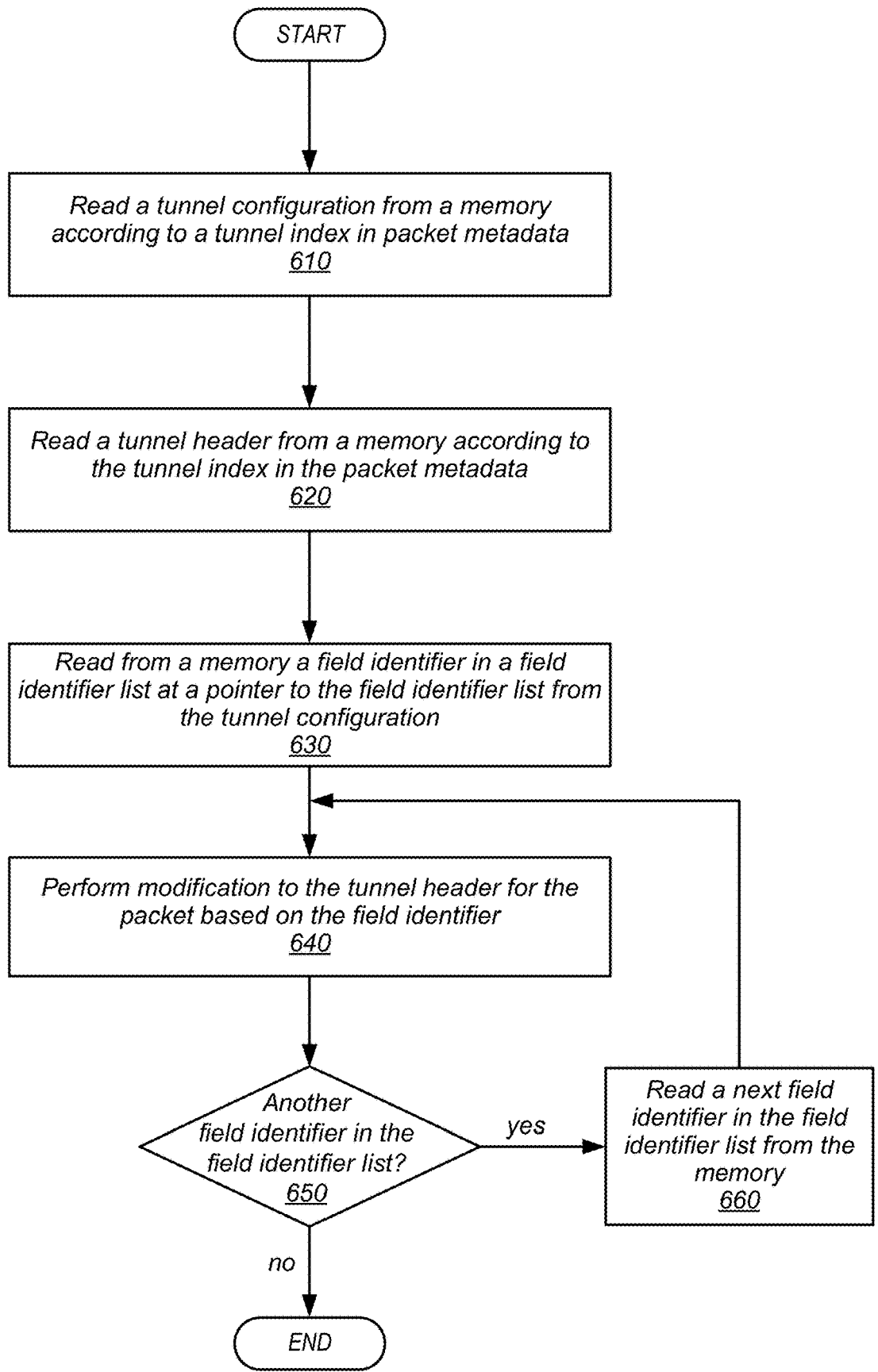
FIG. 6 is a high-level flowchart illustrating various methods and techniques to implement creating a tunnel header from programmed tunnel data stored in multiple memories, according to some embodiments.

If tunneling is enabled for the packet, as indicated by the positive exit from 520, then one or more memories implemented as part of the packet processor may be accessed to obtain programmatically stored tunnel header data, as indicated at 530, in various embodiments. Programmatically stored tunnel header data may be data stored to the memories programmatically (e.g., via tunnel management 300 in FIG. 3) that provides the tunnel header to be inserted into the packet, the configuration of the tunnel header, and identification of data fields to be added to the tunnel header that are dependent upon the particular packet in which the tunnel header is being inserted. Different techniques to obtain the programmatically stored tunnel header data may be implemented. For example, the memor(ies) may be one or more content addressable memories, which may provide lookups for tunnel header data (e.g., based on a field identifier provided in packet metadata). FIG. 6, discussed below, provides other examples of techniques for obtaining tunnel header data from the memories.

Tunnel header data may include tunnel configuration data, which indicates where the tunnel header is to be inserted (e.g., at L2, L2.5, L3, or L4) and other information to insert or determine field values in the header. Tunnel header data may also describe fields with values that are the same or independent of the packet, such as a tunnel header label field as part of a multiprotocol label switching (MPLS) tunnel header, which may be copied directly into the tunnel header. Tunnel header data may also include field identifiers that identify respective data fields in the tunnel header that have values that are dependent upon the particular packet which may be determined and inserted into the tunnel header. Packet dependent data may be determined from packet metadata, such as the packet metadata mentioned above, or from a set of data calculated for packets received at the packet processor. Consider an example where a tunnel header needs to include a checksum field as part of the tunneling protocol. The type of checksum to be included may be identified by the tunnel header data (e.g., an L2 checksum). When the packet is received different checksum values may be computed for different levels including L2 (e.g., by calculating a checksum of all packet bytes encapsulated within the L2 header). Thus, the L2 checksum calculated for the packet may be used to determine the field value for the field that is identified by a field identifier for the tunnel header.

As indicated at 530, the packet may be modified to insert the tunnel header into the packet according to the tunnel header data, in various embodiments. The values of fields that are independent of the packet may be copied directly from the tunnel header in memory. For those fields of the tunnel header that are identified by field identifiers, the values of the fields may be determined (as discussed above), and the tunnel header modified to include those values.

Other packet modifications may be performed, in some embodiments, as indicated at 560, whether tunneling is enabled for the packet (or not as indicated by the negative exit from 520). Other packet modifications may include performing modifications dependent on forwarding decisions made earlier in the packet processor (e.g., during L2 or L3 forwarding). As indicated at 560, the modified packet may then be transmitted.

Multiple memories storing tunnel header data may be implemented, in some embodiments, to leverage the speed of high performance memory along with reduced power costs. FIG. 6 is a high-level flowchart illustrating various methods and techniques to implement creating a tunnel header from programmed tunnel data stored in multiple memories, according to some embodiments. For instance, as discussed above in FIG. 4, separate memory modules, components, or devices may be implemented as part of the packet processor or accessible to the packet processor in order to store different portions of tunnel header data, such as the tunnel header, tunnel header configuration, and/or field identifiers for the tunnel. In at least some embodiments, the memories may be random access memories (e.g., SRAM or DRAM). As indicated at 610, a tunnel configuration may be read at a location in the memory storing the tunnel configuration identified according to a tunnel index for the packet in packet metadata. The tunnel index (or pointer) may be maintained in the routing table or with other tunneling data that indicates the particular tunneling protocol to be applied to the packet. The tunnel configuration may include data that describes the location that the tunnel header is to be inserted into the packet (e.g., L2, L2.5, L3, or L4), the length of the tunnel header (e.g., in bytes), a pointer to the field identifiers for the tunnel in a stored in a separate memory (or in a different location at the memory), a number of field identifiers, and a next header type.

As indicated at 620, a tunnel header may be read from a memory at location identified by the tunnel index (or pointer) in the packet metadata. The tunnel header may be a copy of the tunnel header for the tunnel protocol with independent, or unchanging fields set with default values. Fields with packet dependent values may also have default values which may be later modified.

The tunnel configuration, as noted above, may include a pointer to a list of field identifiers for the tunnel header. The pointer may be an address in a memory storing the field identifiers which includes a list of identifiers stored adjacently. The number of identifiers included in the configuration data may allow the list of identifiers to be scanned until the number of identifiers in the list is read. For example, as illustrated in FIG. 6, the first field identifier may be read starting at the list pointer location in the memory for the field identifiers. Each field identifier may include a field type, field offset within the tunnel header (e.g., a number of bits), and field width of the field to be modified (e.g., in bits) to determine the location in the tunnel header that is to be modified. The modification may be performed based on the field identifier, as indicated at 640. Field identifiers types may identify many different types of fields that are dependent on the data in the packet including, but not limited to, TTL or hoplimit, packet length for L2 (which includes L2 header length+L2.5 header length+L3 header length+L4 header length+payload length), packet length for L2.5 (which includes L2.5 header length+L3 header length+L4 header length+payload length), packet length for L3 (which includes L3 header length+L4 header length+payload length), and packet length for L4 (which includes L4 header length+payload length), tunnel header checksum (which includes a checksum of tunnel header bytes), L2 data checksum (which includes a checksum of all packet bytes encapsulated within the L2 header), L2.5 data checksum (which includes a checksum of all packet bytes encapsulated within the L2.5 header), L3 data checksum (which includes a checksum of all packet bytes encapsulated within the L3 header), and L4 data checksum (which includes a checksum of all packet bytes encapsulated within the L4 header(which are the payload packet bytes)). The values for these fields may be pre-computed for each packet that is received at the packet processor (whether or not they are identified for a particular tunnel header).

If further field identifiers remain to be read from the memory storing the field identifiers, as indicated by the positive exit from 650, then the next field identifier in the field identifier list may be read, as indicated at 660 and then a subsequent modification made (as illustrated by the arrow returning to element 640). If no further field identifiers remain, then the tunnel header packet may be complete. In some embodiments, if a next header field is included in the tunnel header, the next header type value identified in the tunnel configuration may be included in the tunnel header.

Figure 7:
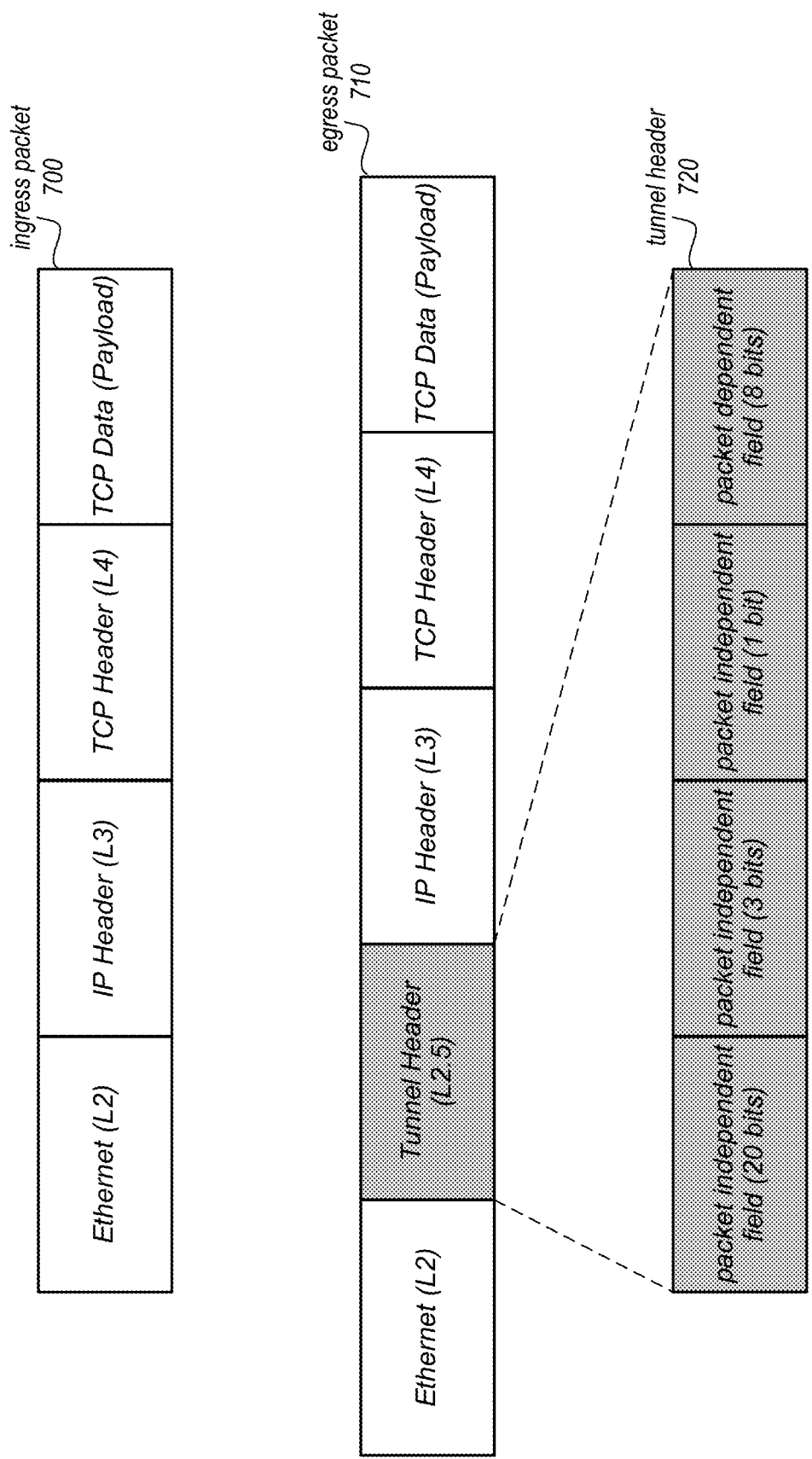
FIG. 7 illustrates an example network packet header before and after tunnel header insertion, according to some embodiments.

FIG. 7 illustrates an example network packet header before and after tunnel header insertion according to the techniques discussed above, in some embodiments. Ingress packet 710 may include Ethernet (L2) header, IP header (L3), TCP header (L4) and TCP data (which includes the payload of the packet). A tunneling protocol, such as a multiprotocol label switching (MPLS), may be enabled for the packet. A tunnel index may be used to lookup the tunnel header and configuration. The tunnel configuration may identify that the tunnel header is to be inserted at L2.5, that the length of the tunnel header is 40 bits, a pointer to the field identifier list in a separate memory, and a number of field identifiers, 1. The 40 bits of the tunnel header may be read from the tunnel header memory (e.g., as discussed above at element 620 in FIG. 6). Then, the field identifiers may be read from the tunnel identifier list. For example, the field identifier may identify the field type (e.g., TTL), offset, 24 bits, and width, 8 bits, as illustrated at tunnel header 720. The packet independent fields need not be modified as only the packet dependent field is dependent on the data in the packet for the field value. The packet dependent value may be obtained from the pre-calculated set of data determined from the data in the packet discussed above.

The one or more memories storing tunnel header data may be programmatically updated to store tunnel header data for new tunneling protocols that may be applied as part of a packet processing pipeline. FIG. 8 is a high-level flowchart illustrating various methods and techniques to implement programming tunnel creation for network packet processing, according to some embodiments. As indicated at 810, tunnel header data may be received for a new tunneling protocol. The tunnel header data may be received via a programmatic interface and/or graphical user interface to the device implementing the packet processing pipeline. For example, tunneling management 300 discussed above in FIG. 3, may provide a command line interface that allows for tunneling header data to be programmatically provided to the device and stored in the appropriate memories. As indicated at 820, a routing table may also be updated to include the new tunneling protocol for identified entries. For example, a new routing table may be downloaded which includes entries that identify some packets for tunneling utilizing the new tunneling protocol. In some embodiments, manual updates may be performed to add the new tunneling protocol to particular entries in the routing table. The updated routing table may include an index or pointer to the tunnel header and/or tunnel configuration in the respective memories storing the tunnel header and tunnel configuration.

As indicated at 830, the tunnel header for the new tunneling protocol may be written to the memory. The tunnel header may include the packet independent and packet dependent field values (which may later be modified). As indicated at 840, the tunnel configuration may be written into the memory storing the tunnel configurations for tunneling protocols. The tunnel configuration may include the information noted above, such as the location that the tunnel header is to be inserted into a packet when applying the new tunneling protocols, the length of the tunnel header (e.g., in bytes), a pointer to the field identifiers for the tunnel in a stored in a separate memory (or in a different location at the memory), a number of field identifiers, and a next header type.

As indicated at 850, the field identifiers may be written to the memory storing field identifiers as a list. The field identifiers may be written adjacently, in some embodiments, and may store the field identifier type, field identifier offset, and the field identifier width, as discussed above. After the tunnel header data has been written to the appropriate memories, packet flow may be enabled at the packet processor, as indicated at 860. Thus when a packet is received that is identified for tunneling according to the new tunnel protocol, the tunnel header data programmatically stored, at elements 830 through 850, may be utilized to insert an appropriate tunnel header into the packet.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A network device, comprising:
   a plurality of physical network interfaces;
   a packet processor;
   at least one processor; and
   a system memory that stores program instructions that, when executed by the at least one processor, cause the at least processor to implement a tunneling management interface, wherein the packet processor is configured to:
　receive a network packet;
　access at least one memory of the packet processor to obtain stored tunnel header data for a tunneling protocol, the tunnel header data comprising a tunnel header and one or more field identifiers that identify respective fields in the tunnel header;
　modify the network packet to insert the tunnel header into the network packet including the one or more field identifiers; and
　transmit the modified network packet modified according to the tunneling protocol,
wherein the tunneling management interface is configured to:
　receive other tunnel header data for another tunneling protocol;
　store the other tunnel header data in the at least one memory, and
wherein the packet processor is further configured to:
　receive another network packet;
　perform the accessing and the modifying with respect to the other network packet using the other header data for the other tunneling protocol stored in the at least one memory; and
　transmit the other modified network packet modified according to the other tunneling protocol.

2. The network device of claim 1, wherein the packet processor comprises an application specific integrated circuit (ASIC) configured to perform packet processing.

3. The network device of claim 2, wherein the at least one processor that implements the tunneling management interface is a general purpose processor.

4. The network device of claim 1, wherein the packet processor comprises:
　a first memory configured to store:
　　a tunnel header of the tunnel header data for the tunneling protocol; and
　　another tunnel header of the other tunnel header data for the other tunneling protocol; and
　another memory configured to store:
　　a list of field identifiers of the tunnel header data for the tunneling protocol, wherein the field identifiers identify respective fields in the tunnel header; and
　　a list of field identifiers of the other tunnel header data for the other tunneling protocol that identify respective fields in the other tunnel header.

5. The network device of claim 4, wherein to modify the network packet or the other network packet, the packet processor is configured to:
　access a set of pre-calculated values, pre-calculated according to data of the network packet or the other network packet, respectively, that correspond to field identifiers in the list of field identifiers for the tunneling protocol or that correspond to field identifier in the list of field identifiers for the other tunneling protocol.

6. The network device of claim 1, wherein the system memory or one or more other memories of the network device store a packet table comprising information for making forwarding decisions and tunneling decisions for network packets based on information included in respective packet headers of the network packets.

7. The network device of claim 6, wherein the tunneling management interface is configured to:
　update forwarding information for one or more entries in the packet table; and
　update tunnel configurations for one or more entries in the packet table.

8. A method, comprising:
　receiving, at a packet processor, a network packet;
　accessing at least one memory of the packet processor to obtain stored tunnel header data for a tunneling protocol, the tunnel header data comprising a tunnel header and one or more field identifiers that identify respective fields in the tunnel header;
　modifying, by the packet processor, the network packet to insert the tunnel header into the network packet including the one or more field identifiers;
　transmitting, by the packet processor, the modified network packet modified according to the tunneling protocol;
　storing, at the at least one memory of the packet processor, tunnel header data for another tunneling protocol;
　receiving, at the packet processor, another network packet;
　performing, by the packet processor, said accessing and said modifying with respect to the other network packet using the other header data for the other tunneling protocol; and
　transmitting, by the packet processor, the modified other network packet modified according to the other tunneling protocol.

9. The method of claim 8, further comprising:
　receiving, via a tunnel management interface, the tunnel header data for the other tunneling protocol.

10. The method of claim 9, wherein the tunnel management interface is implemented via a general purpose processor, and wherein the packet processor comprises an application specific integrated circuit (ASIC) specifically configured to perform packet processing.

11. The method of claim 9, further comprising:
　implementing a command line interface or a graphical user interface for the tunnel management interface, wherein the command line interface or the graphical user interface enables the tunnel header data for the other tunneling protocol to be provided.

12. The method of claim 9, further comprising:
　implementing a programmatic interface for the tunnel management interface, wherein the programmatic interface enables the tunnel header data for the other tunneling protocol to be programmatically provided.

13. The method of claim 9, further comprising:
　updating a routing table based on information received via the tunnel management interface, wherein the routing table stores forwarding addresses and tunnel configuration information for a plurality of routing table entries.

14. The method of claim 8, wherein the packet received at the packet processor is addressed according to a first internet protocol (IP) protocol version;
　and wherein the modified network packet is addressed according to a second internet protocol (IP) protocol version.

15. The method of claim 14, wherein the other network packet received at the packet processor is addressed according to the first internet protocol (IP) protocol version; and
　wherein the other modified network packet is addressed according to a third internet protocol (IP) protocol version.

16. A system, comprising:
　a device configured to perform packet processing, the device comprising:
　　one or more network interfaces configured to transmit and receive network packets via a network connection to the device; and a packet processing pipeline, configured to:
  receive a network packet;
  access at least one memory to obtain stored tunnel header data for a tunneling protocol, the tunnel header data comprising a tunnel header and one or more field identifiers that identify respective fields in the tunnel header;
  modify the network packet to insert the tunnel header into the network packet including the one or more field identifiers;
  transmit the modified network packet modified according to the tunneling protocol;
  store, at the at least one memory, tunnel header data for another tunneling protocol;
  receive another network packet;
  perform said accessing and said modifying with respect to the other network packet using the other header data for the other tunneling protocol; and
  transmit the modified other network packet modified according to the other tunneling protocol.

17. The system of claim 16, wherein the device further comprises a tunnel management interface, and wherein the tunnel management interface is configured to:
  receive the tunnel header data for the other tunneling protocol to be applied by the packet processing pipeline; and
  write the other tunnel header data to the at least one memory.

18. The system of claim 17, wherein the tunnel management interface is implemented via a general purpose processor, and
  wherein the packet processing pipeline is implemented at least in part via one or more application specific integrated circuits (ASICs) specifically configured to perform packet processing.

19. The system of claim 16, wherein the at least one memory is at least one content addressable memory.

20. The system of claim 16, wherein the at least one memory is at least one random access memory (RAM).

* * * * *